United States Patent [19]
Rastoin

[11] Patent Number: 4,658,708
[45] Date of Patent: Apr. 21, 1987

[54] MACHINE FOR CONTINUOUSLY AND UNIFORMLY COATING CONFECTIONERY PRODUCTS

[75] Inventor: Blaise Rastoin, Aix-en-Provence, France

[73] Assignee: Transitube Projet, Aix-en-Provence, France

[21] Appl. No.: 814,750

[22] Filed: Dec. 31, 1985

[30] Foreign Application Priority Data

Jan. 9, 1985 [FR] France ............................ 85 00412
Jun. 6, 1985 [FR] France ............................ 85 08702

[51] Int. Cl.$^4$ .......................... A47J 37/12; A23L 1/18
[52] U.S. Cl. ........................... 99/323.9; 99/404; 99/443 C; 118/24; 198/659; 426/289
[58] Field of Search ............... 99/404, 443 C, 323.9; 198/622, 625, 659, 676; 118/DIG. 6, 19; 426/289, 291, 292, 293; 366/309, 310

[56] References Cited

U.S. PATENT DOCUMENTS

| | | | |
|---|---|---|---|
| 1,374,938 | 4/1921 | McNutly | 118/19 |
| 1,529,461 | 3/1925 | Brogden | 118/DIG. 6 |
| 1,794,346 | 2/1931 | Brogden | 134/6 X |
| 1,893,672 | 1/1933 | James | 425/104 |
| 1,985,842 | 12/1934 | Skinner | 426/293 |
| 2,033,044 | 3/1936 | McDill | 118/DIG. 6 |
| 3,198,655 | 8/1965 | Gisiger | 118/24 X |
| 4,192,418 | 3/1980 | Montgomery | 198/659 |

FOREIGN PATENT DOCUMENTS

| | | |
|---|---|---|
| 558454 | 8/1923 | France . |
| 562054 | 11/1923 | France . |
| 856763 | 12/1960 | United Kingdom . |
| 1484518 | 9/1977 | United Kingdom . |

*Primary Examiner*—Billy J. Wilhite
*Attorney, Agent, or Firm*—Balogh, Osann, Kramer, Dvorak, Genova & Traub

[57] ABSTRACT

This invention relates to machines for manufacturing confectionery products which comprise a solid, gelatinous or pasty core uniformly coated with liquid and/or powdery products. Such machines comprise one or more helicoidal brushes composed of bristles which are implanted radially along helices over one or two shafts which are driven in rotation at a speed of less than 100 rpm in a trough which is open in its upper part and which has a height greater than that of the brushes and a cylindrical bottom.

11 Claims, 20 Drawing Figures

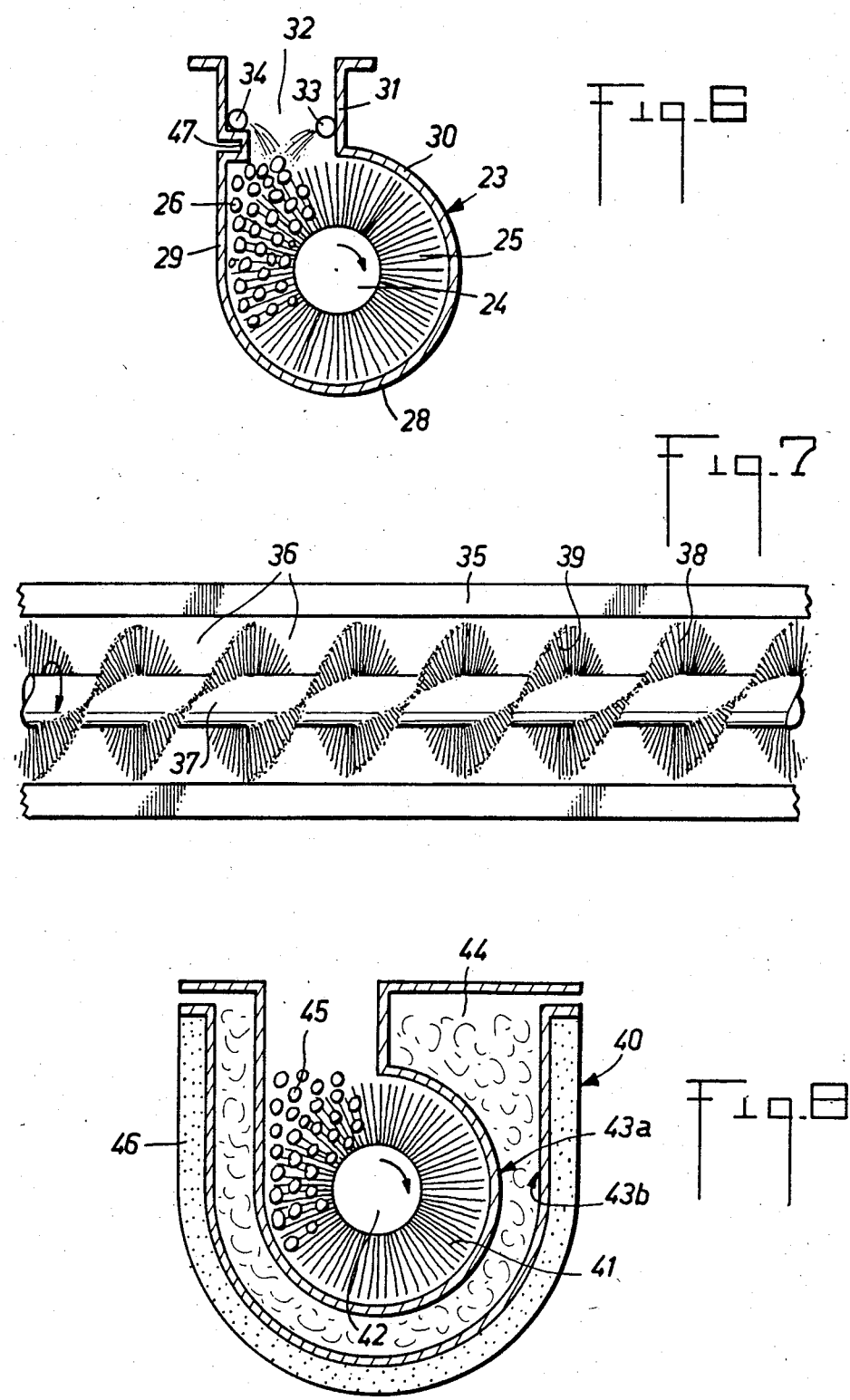

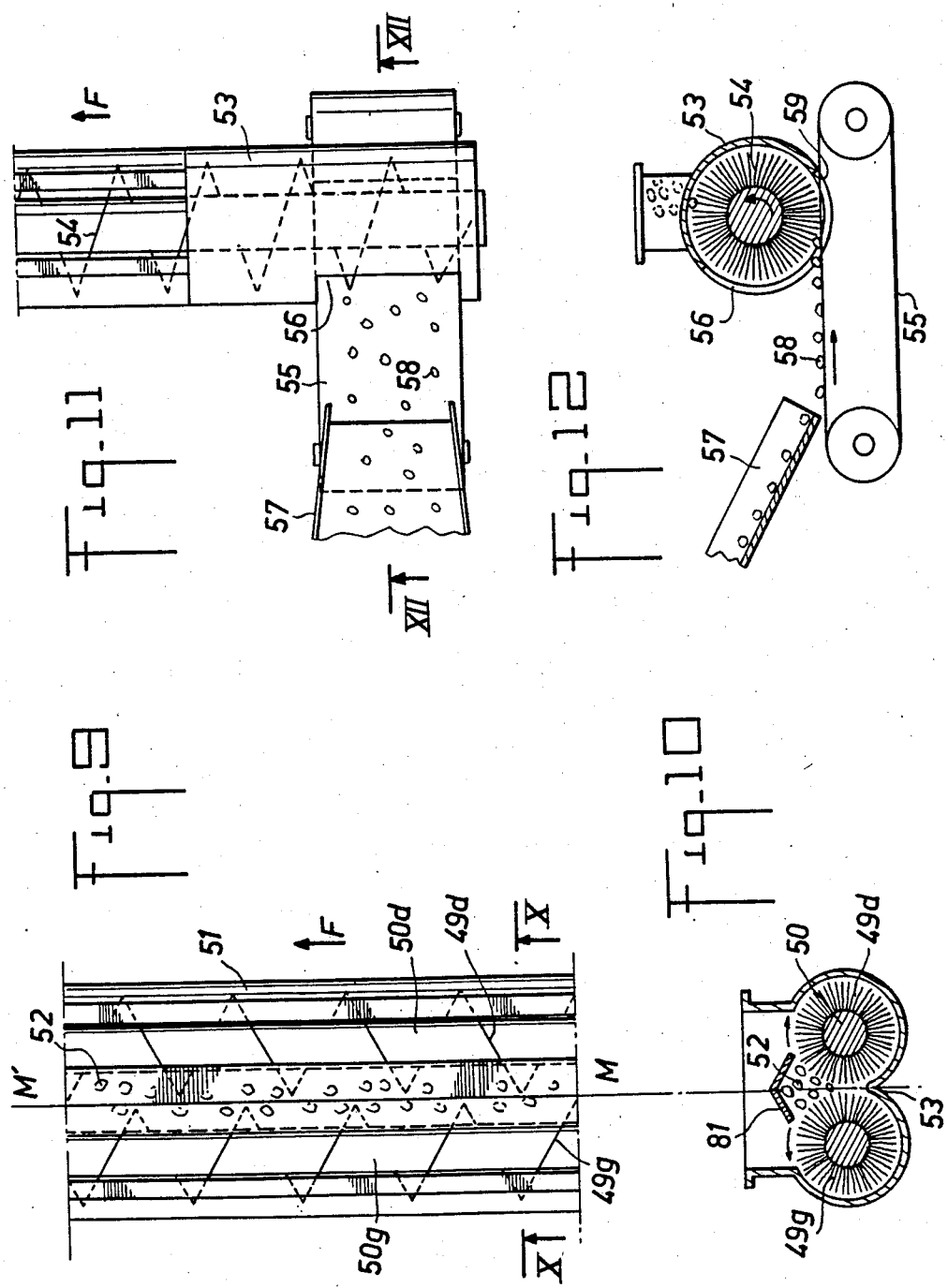

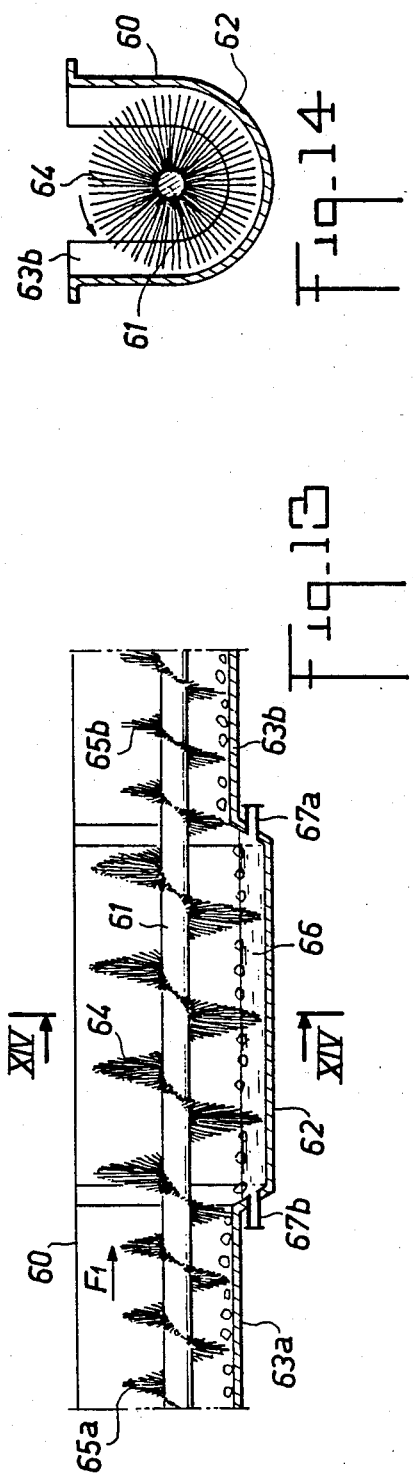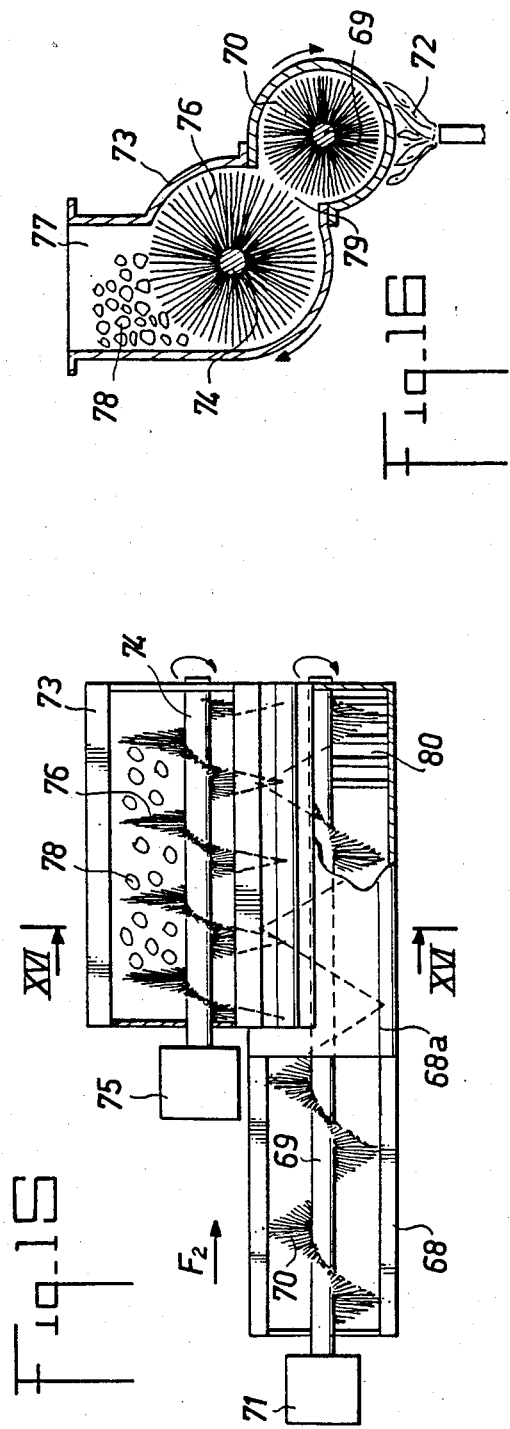

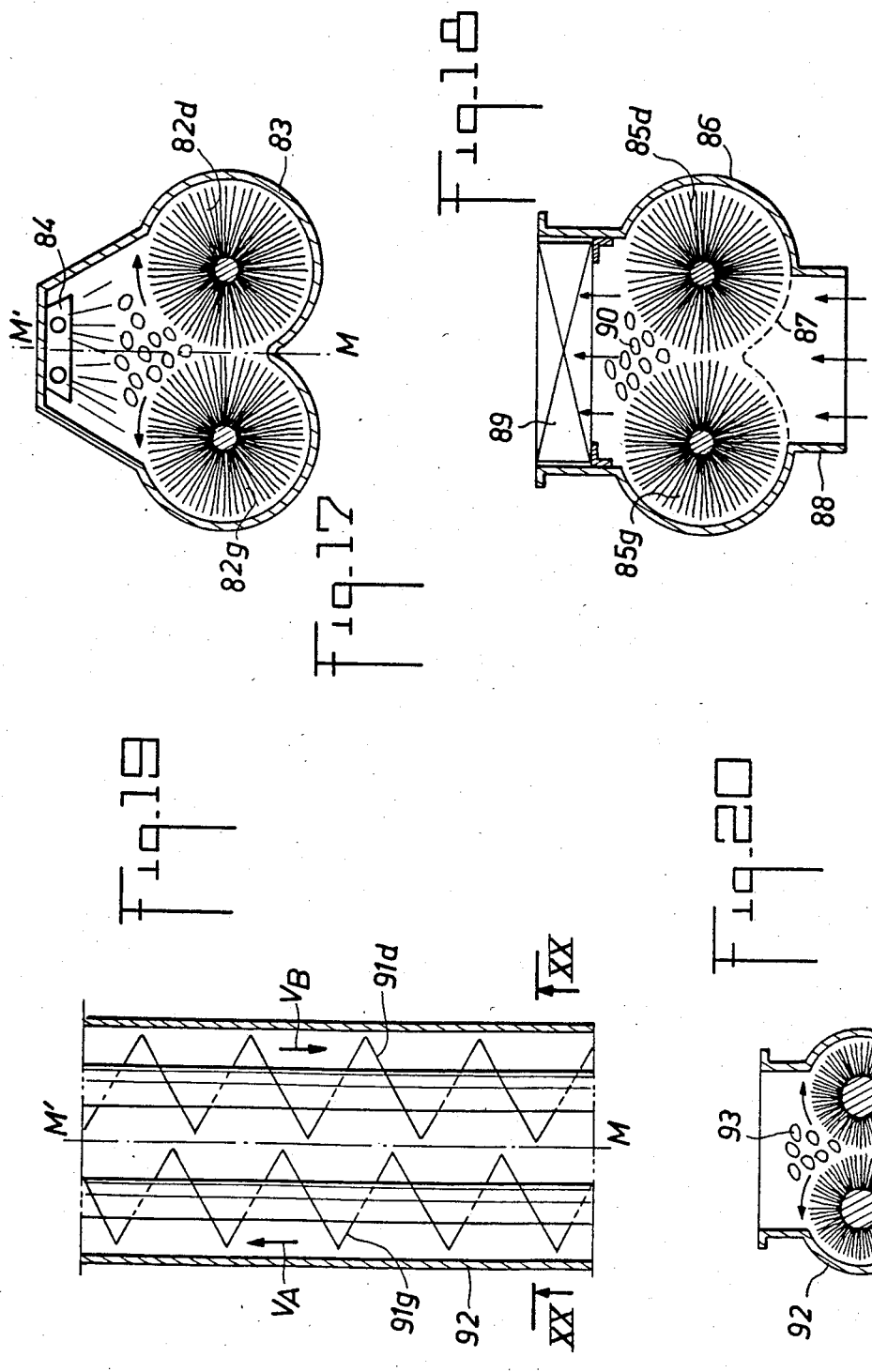

MACHINE FOR CONTINUOUSLY AND UNIFORMLY COATING CONFECTIONERY PRODUCTS

The present invention relates to machines for continuously and uniformly coating confectionery products comprising a solid, gelatinous or pasty core enveloped by one or more uniform layers, with one or more liquid and/or powdery products, for example sweets, aperitif biscuits, popcorn, etc.

The manufacture of certain sweets, particularly those which comprise a gelatinous core, includes an operation during which said core is moistened uniformly by a liquid, coloured or not, then particles of sugar in powder form are made to stick uniformly on the moist layer.

Such coating operations are delicate. The coating layers must be uniform over the whole periphery of the core. The soft cores must not be crushed nor broken. The cores must not stick together.

Up to the present time, the coating operations have been carried out in a hemispherical or cylindrical vessel or recipient which is driven in rotation about its axis at relatively slow speed and which is called turbine in the trade.

A certain quantity of product to be coated is placed in the vessel, for example gelatinous cores, and one or more liquids, coloured or not, are poured into the vessel whilst it is rotating, said liquids uniformly impregnating the gelatinous cores, then sugar in powder form is poured in, which sticks on the moistened periphery of the cores in order to form a uniform coating.

In the vessel, the cores rotate on themselves, with the result that the liquid, then the particles of sugar, are distributed uniformly over the periphery of each core.

After a certain mixing time, rotation is stopped and the coated products are removed from the vessel.

This technique is at its height and it enables a uniform coating to be obtained, without altering the products such as relatively fragile gelatinous cores. However, this technique presents the drawback of being essentially discontinuous.

The coating of sweets has been chosen by way of example, but the same problem of coating is posed in other cycles of manufacture.

For example, numerous aperitif biscuits are manufactured by extrusion of paste through a die, after which the pieces of paste are moistened with a liquid then dusted with salt, sugar or spices.

G.B. Pat. No. 856 763 (The City Bakeries) describes an apparatus for coating confectionery products with sugar, which is composed of an Archimedean screw rotating in a trapezoidal trough. The screw is composed of rods which are implanted radially on a shaft and which bear helically wound wires.

U.S. Pat. No. 1,893,672 (L. G. James et al) describes a machine for manufacturing sweets which comprises a helicoidal brush rotating in an oscillating trough having a perforated bottom.

The combined action of the brush and of the oscillating trough serves to remove the excess starch.

U.S. Pat. No. 1,374,938 (D. H. McNulty) describes a machine for coating sweets with sugar.

This machine comprises a rotating cylindrical sieve which rotates inside a trough. The machine comprises an endless screw inside the sieve and outside screws fast with the sieve.

It is an object of the present invention to provide machines for continuously and uniformly coating confectionery products comprising a solid, gelatinous or pasty core with a liquid and/or powdery product.

A machine according to the invention is of the known type comprising a substantially horizontal fixed trough, an endless screw which is driven in rotation in this trough and means for introducing into the trough the cores to be coated and the liquid and/or powdery products.

The object of the invention is attained by means of a machine which comprises one or more helicoidal brushes composed of bristles implanted radially and helically on one or two drive shafts which are driven in rotation in said trough at a speed of less than 100 rpm and said trough is upwardly open, has a height greater than the diameter of said brushes and has a cylindrical bottom which envelops said brushes in the part located beneath said drive shafts.

According to a preferred embodiment, a machine according to the invention comprises two helicoidal brushes of the same diameter composed of bristles implanted radially and helically on two parallel drive shafts which are driven in rotation in opposite directions and such that the bristles of the two brushes move upwardly in the central part of the trough.

The invention results in the continuous coating of products such as sweets, aperitif biscuits or like products requiring operations of coating or dusting.

The process according to the invention makes it possible to construct continuously operating, automatized installations and to reduce handling and manpower, therefore manufacturing costs.

Coating is as uniform as that of the products manufactured discontinuously in heretofore used rotating vessels called turbines.

This result is due to the fact that the products to be coated which are poured into the trough of a machine according to the invention rotate continuously on themselves whilst being displaced by the helicoidal brush.

It is observed that the products being coated form between each pair of threads of the helicoidal brush, a small packet which rotates continuously on itself in a restricted space and, at the same time, each core also rotates on itself within the packet, with the result that the impregnation of the cores by a liquid then by solid particles is distributed uniformly over the whole periphery of each core.

Rotation of the packets of cores and of the cores within the packets is due to the thrust of the bristles of the brush on the cores. As these bristles are supple, this thrust does not deteriorate the cores and does not deform them, even if they are soft, gelified or pasty cores.

The bottom of the trough is cylindrical and the bristles of the brush rub against the walls of the trough, this having for its effect to sweep them and avoid deposits adhering thereto.

The lateral walls of the trough are vertical or very slightly outwardly divergent, with the result that the cores which are taken along by the brush along the cylindrical wall and which then escape the brush, cannot follow the vertical wall and they drop back into the bottom of the trough.

Finally, a mini-turbine effect similar to that obtained in the heretofore used discontinuous turbines is produced in each space between two successive threads of the screw.

A machine according to the invention may be used for coating all sorts of products, for example for coating almonds, hazelnuts or peanuts. In that case, the grilled nuts are firstly moistened with a fixing liquid, for example a liquid based on alginate or oil, and they are then dusted with sugar or salt.

The machines according to the invention, comprising two helicoidal brushes of reverse pitch, mounted on two parallel shafts, present the advantage that the products being coated accumulate between the two brushes where an intense mixing effect of said products is produced without said products coming into contact with the walls of the trough.

The machine according to the invention comprising one or two curved lateral walls which extend the semicylindrical bottom of the trough above the horizontal plane in which the axis or axes of the drive shafts lie, present the advantage of eliminating the necessity of mounting these shafts on bearings and avoid the phenomena of auto-saturation of the machine in the event of the output of product to be coated being greater than the capacity of conveying of the machine.

The machines according to the invention comprising one or two drive shafts each bearing bristles which are implanted on said shaft along two parallel and intercalated helices, make it possible to increase the output of the machine without increasing the speed of rotation.

The machines according to the invention, equipped with a spray pipe or any other equivalent means for distributing a cleaning liquid, are selfcleaning machines which make it possible to pass rapidly from the manufacture of one product to that of another product.

The invention will be more readily understood on reading the following description with reference to the accompanying drawings, in which:

FIG. 6 is a transverse section of another embodiment of a machine according to FIG. 1.

FIG. 7 is a partial plan view of a third machine according to the invention.

FIG. 8 is a transverse section through a machine according to the invention for making burst cereals.

FIGS. 9 and 10 represent, respectively, a plan view and a transverse section along X—X, of a variant construction of a machine according to the invention.

FIGS. 11 and 12 represent, respectively, a plan view and a transverse section along XII—XII, of a device for introducing cores at the head of a machine according to the invention.

FIGS. 13 and 14 represent, respectively, a longitudinal section and a transverse section along XIV—XIV, of part of a machine according to the invention for cooking food products in an oil bath.

FIGS. 15 and 16 represent, respectively, a plan view and a transverse section along XVI—XVI of a machine according to the invention for manufacturing burst cereals.

FIGS. 17 and 18 show transverse sections of machines according to the invention.

FIGS. 19 and 20 show a plan view and a transverse section of a variant embodiment of the machine according to the invention.

Figure 1:
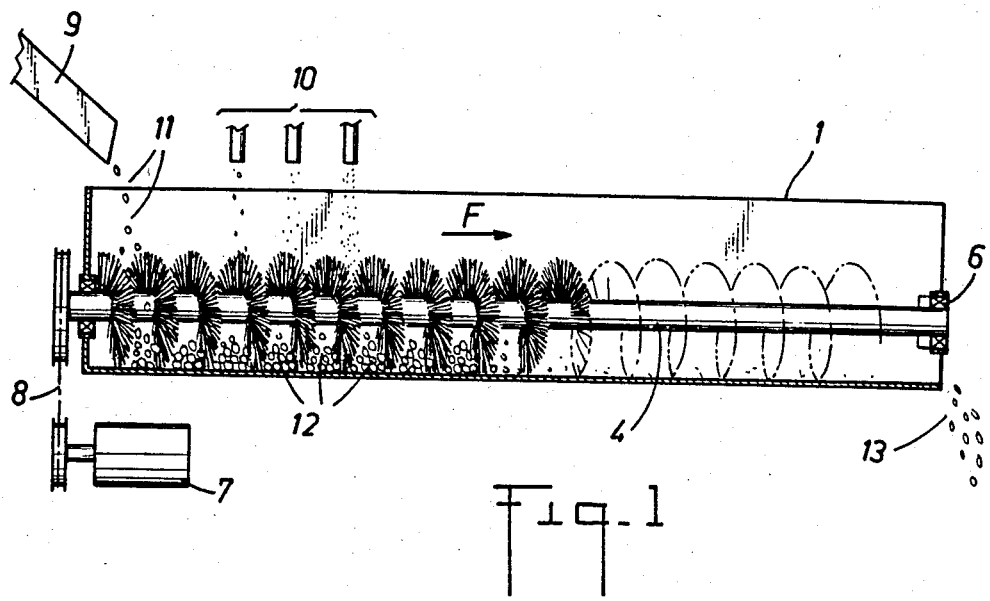
FIG. 1 is a longitudinal section through a coating machine according to the invention.

Referring now to the drawings, the various Figures represent machines for continuously coating solid products with liquids such as sweet syrup, honey or oil and/or with powdery products such as salt, sugar, cocoa, under conditions such that the solid products are coated uniformly by the liquid and/or powdery products.

The machines according to the invention are used in particular in the manufacture of confectionery products such as sweets, salted or sweet biscuits, dried fruits or nuts coated with sugar or salt, and, in general, any product comprising a solid, pasty or gelatinous core which must be moistened uniformly and/or coated uniformly with one or more layers of a powdery product.

The machines according to the invention may serve, in addition, to manufacture products which require a baking step, for example burst cereals of the popcorn type or the like.

Figure 2:
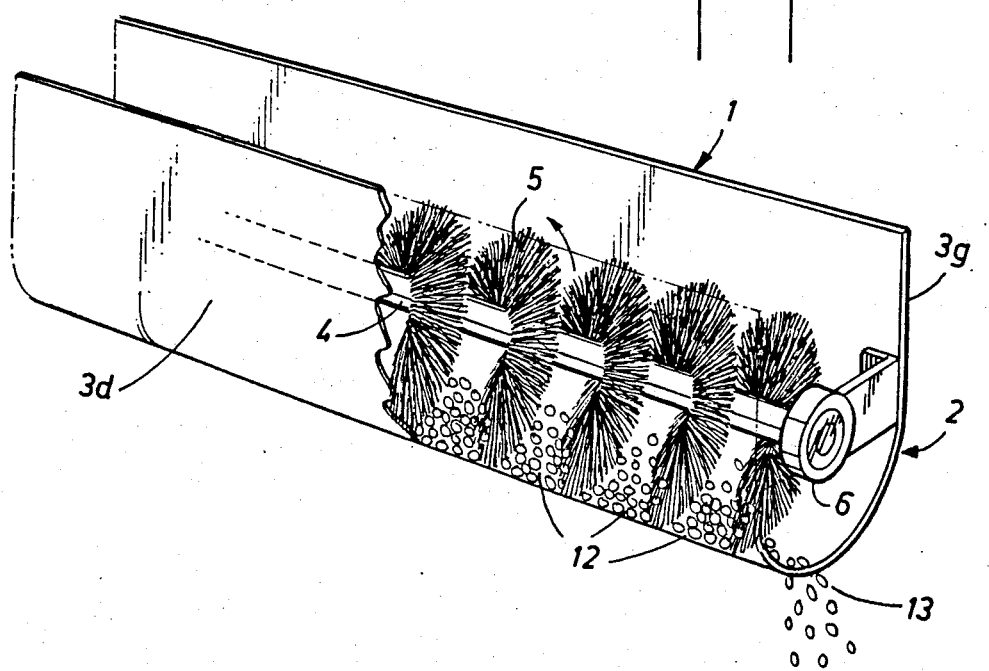
FIG. 2 is a partial view in perspective of the front end of the same machine.

FIGS. 1 and 2 show a machine which comprises a rectilinear trough 1, composed of a cylindrical bottom 2, in the form of a semi-circle extended by two lateral walls 3d and 3g, which are vertical in the example shown.

In a variant embodiment, the lateral walls may slightly diverge outwardly whilst remaining close to the vertical. Trough 1 is open in its upper part and at the front end.

A machine according to the invention further comprises an endless screw which is composed of a drive shaft 4 and a helicoidal brush 5, constituted by supple bristles, for example horse-hair or synthetic fibres which are implanted helically over the shaft 4. The two ends of shaft 4 are supported by bearings 6, for example roller bearings, which are disposed so that the shaft 4 and the semi-cylindrical bottom 2 of the trough are substantially coaxial. The length of the bristles of the brush 5 is slightly greater than the radius of the semi-cylinder 2, with the result that the bristles rub against the cylindrical walls of the trough. The total height of the trough 1 is of the order of 1.5 times the diameter of the helicoidal brush. The shaft 4 is driven in rotation at slow speed, less than 100 rpm, by an electric motor 7 and a transmission 8, for example a transmission by pulleys and belts in the direction such that the products which are poured into the trough are taken along towards the end thereof.

A chute 9 is located above trough 1, in the vicinity of the rear end, and it pours therein products 11 to be coated, for example gelatinous cores of sweets or pieces of paste emerging from an extruder for manufacturing aperitif biscuits.

Reference 10 represents means for injecting into the trough various liquid or powdery products. For example, in the case of impregnating sweets, a coloured liquid is firstly injected, this serving to moisten the gelatinous core in order to soften it and dye it. Sugar in powder form is then injected, this sticking on the moistened surface on which a uniformly distributed coating must be formed.

Chute 9 and distributors 10 continuously deliver a constant flow and the endless screw rotates permanently, with the result that the coating operation is continuous.

The cores 11 which drop into the bottom of the trough form in the intermediate space between each pair of threads of the endless screw a small packet 12 of cores. This packet is pushed forwards by the endless screw.

The cores 11 which are in contact with the bristles of the rotating brush are taken upwardly along the cylindrical wall of the trough. When they arrive at the level of the drive shaft 4, they are no longer taken along and they fall back towards the interior of the trough under the thrust of those lying therebeneath and which are being driven upwardly.

This results in that each packet 12 continuously rotates on itself whilst it is advancing and each core also rotates in all directions within the packet which contains it. A mixing effect is obtained which is identical to that produced in the discontinuous turbines used heretofore for effecting uniform coatings.

The process according to the invention has the advantage of being continuous. A continuous flow of coated products 13 is collected at the outlet of the trough.

A machine according to the invention may comprise a plurality of troughs mounted in cascade and each equipped with an endless screw, with the result that the products leaving one trough drop into the following one. Such a machine makes it possible to manufacture coated products which must comprise a plurality of successive coating films of different nature, such as for example dragées or sugar-coated pills. In that case, hardening of the coating layers is accelerated by projecting a stream of hot air onto the moistened products as they leave each trough.

As the bristles of the helicoidal brush 5 rub against the inner wall of the trough 1, they continually sweep this wall, this avoiding deposits adhering thereto. This function of brushing the wall is very important as sugared juices are most often used for coating purposes, which tend to stick to the walls and produce a solid crust and the brushing action avoids the formation of such a crust. This would not be possible with a rigid endless screw which should be separated from the wall by a clearance in which deposits would be formed.

With respect to a rigid endless screw, a machine according to the invention comprising a helicoidal brush presents the advantage that the action of the supple bristles on the cores to be coated which are generally soft does not risk deforming said cores or scratching them, which would lead to manufacturing rejects.

Figure 3:
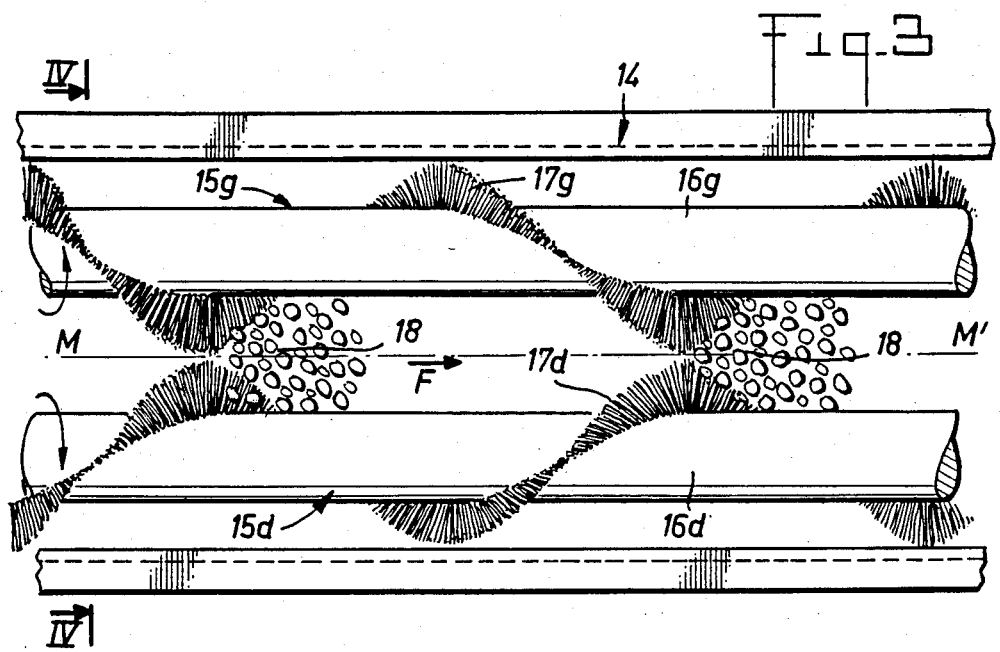
FIG. 3 is a partial plan view of a second coating machine according to the invention.
Figure 4:
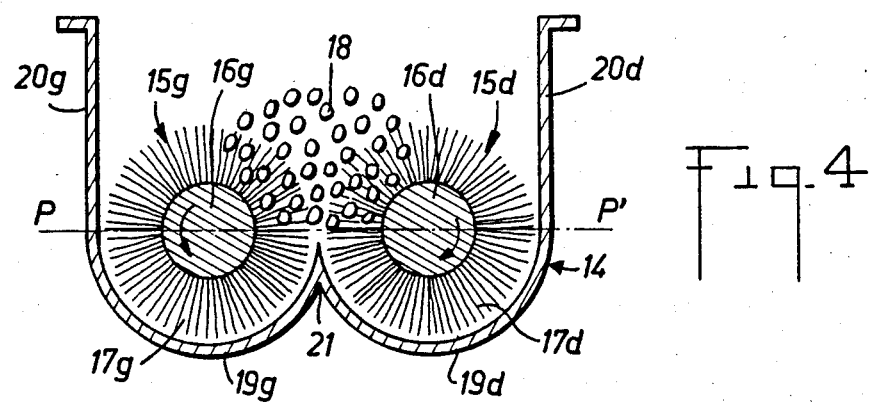
FIG. 4 is a transverse section along IV—IV of FIG. 3.

FIGS. 3 and 4 show a second machine according to the invention which comprises a rectilinear trough 14 open at the top and at the front end and two helicoidal brushes 15d and 15g which are parallel to each other. Each helicoidal brush comprises a rigid rectilinear drive shaft 16d and 16g respectively and bristles 17d, 17g implanted helically over said shaft in order to form a helicoidal brush. The bristles may be composed of animal hair, vegetable stalks, synthetic fibres or metal wires.

The two helices are of equal pitches and of opposite directions. Arrow F represents the direction of displacement of the products to be coated. The solid cores of these products are poured into the trough near the upstream end thereof and they are displaced in the direction of the arrow, forming ball-shaped piles 18 which rotate on themselves at the same time as they advance, this resulting in each core being coated uniformly by the liquids and/or powdery solids poured into the trough.

FIG. 4 shows a transverse section oriented downstream, i.e. viewed in the direction of displacement of the products.

FIGS. 3 and 4 show that the helix 15g, located to the left in the Figure, has a right-handed pitch and is driven in rotation in the direction opposite the pitch, i.e. in anti-clockwise direction.

The helix 15d located to the right has a left-handed pitch and it is driven in rotation in clockwise direction with the same absolute speed of rotation.

The two helices are disposed symmetrically with respect to the longitudinal median plane, i.e. substantially in phase opposition with respect to each other and they are substantially tangential to one another in the median plane.

FIG. 4 shows that the bristles of the two brushes located between the two drive shafts 16d and 16g, in that part where the two brushes are tangential, move upwardly and it is in this part that the products to be coated, which are lifted by the bristles of the brushes and which drop back when they escape therefrom, accumulate to form a pile 18 which is animated by a movement of rotation on itself. As shown in FIG. 3, there is formed in the space defined by the two drive shafts 16g and 16d a succession of piles 18 each located downstream of a point of tangency of the two brushes and each of these piles performs a function of miniturbine which continually mixes the products to be coated from one end of the trough 14 to the other where they are evacuated.

As shown in FIG. 4, the bottom of trough 14 is advantageously composed of two joined portions of cylinder 19g and 19d which each envelop part of the periphery of a screw up to the level of plane PP' in which lie the axes of the shafts 16g and 16d and which extend above this plane PP' by vertical or inclined walls 20d, 20g.

The two semi-cylinders 19g and 19d are symmetrical with respect to the median longitudinal plane and they intersect therein, forming a central edge 21 which engages between the two helices whilst remaining tangential thereto.

Figure 5:
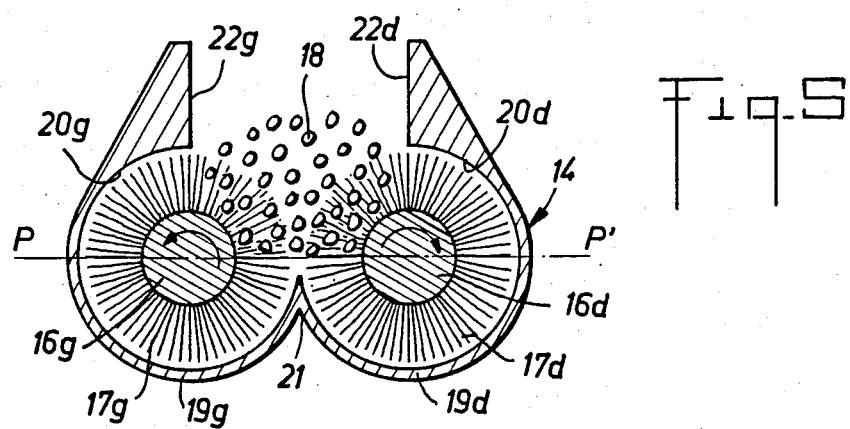
FIG. 5 is a transverse section of a variant embodiment of the machine according to FIG. 3.

FIG. 5 shows a transverse section of a variant embodiment.

Homologous parts are represented by the same reference in FIGS. 4 and 5. The helices are identical.

The two lateral walls 20d and 20g of the trough located above plane PP' are in the form of portions of cylinder which extend the portions of cylinder 19d and 19g, with the result that each endless screw is enveloped over more than half of its periphery and advantageously three quarters of its periphery as shown in FIG. 3. This particular form of the lateral walls of the trough presents the advantage that the two brushes are maintained in position in the bottom of the trough by the lateral walls without it being necessary to mount the shafts 16g and 16d in bearings to prevent the brushes from lifting. The bearings which brake the displacement of the products to be coated and which disturb the regularity of the movement of mixing of the piles of products are thus eliminated.

Furthermore, in the event of saturation of the machine, the products to be coated may rise in the vertical part of the trough located between the vertical or slightly inclined walls 22d, 22g which extend above the brushes.

The products then escape the action of the brushes and self-regulation of the phenomenon of saturation is thus obtained.

The embodiments according to FIGS. 3 to 5 which comprise two parallel brushes present the advantage, over the machines comprising one brush only, that the piles 18 of products to be coated are located between the two brushes, without any contact with the walls of the trough. Friction against the walls, which may damage certain fragile products and which may render coating of the products non-uniform, is thus avoided.

Moreover, the machines with double helix make it possible to increase the output of the machine and the granulometry of the products, as the space between the two brushes in which the piles of products 18 are formed and maintained is more voluminous than the space between the rising bristles and a lateral wall of the trough where the products accumulate in the case of a machine with one helicoidal brush.

FIG. 6 shows a transverse section looking downstream, i.e. in the direction of flow of the products, of a machine according to the invention comprising one helicoidal brush composed of a drive shaft 24 on which is implanted a helicoidal brush 25 formed by bristles.

FIG. 6 corresponds to a helix having a left-handed pitch which is driven in rotation in clockwise direction.

The products to be coated accumulate, forming a pile 26 along the lateral wall of the trough 23 which is swept by the bristles of the brush in the rising direction. Trough 23 has a bottom 28 in the form of a semi-cylinder which follows the contour of the helicoidal brush. The lateral wall 29 of the trough located on the side swept in the rising direction joins the cylindrical bottom 28 tangentially. The wall 30 of the trough which is swept by the helicoidal brush in the descending direction has the form of a portion of cylinder which extends the cylindrical bottom 28, with the result that the trough envelops the helicoidal brush over more than half of its periphery. The cylindrical wall 30 advantageously extends up to the vertical of the axis of the shaft 24, with the result that the trough envelopes three quarters of the periphery of the brush.

The cylindrical wall 30 is extended upwardly by a flat wall 31 which may be vertical or slightly oblique and which defines with wall 29 a chute 32 surmounting the brush. In the case of a machine with one brush, this arrangement presents the same advantages as the embodiment according to FIG. 5.

The helicoidal brush is maintained in the bottom of the trough by the cylindrical wall 30 without it being necessary to mount the shaft 24 in bearings. Moreover, in the event of saturation, the products in excess rise in the chute 32 where they escape the action of the brush and wall 30 avoids their being driven in rotation about shaft 24 and joining the pile which precedes them.

FIG. 6 shows a cleaning device which may be applied to all the machines according to the invention.

This device comprises one or more pipes 33, 34 which distribute a cleaning liquid, for example hot water, all along the trough. These pipes may be perforated tubes or tubes equipped with sprays which project jets of atomized liquid into the trough.

The machines according to the invention, particularly those serving to manufacture products coated with sugar, tend to clog and it is necessary to clean them after each work station.

To that end, it suffices to actuate the liquid-distributing pipes 33, 34. The bristles of the brush which rub against the walls then act as cleaning brush and the dirt is taken along towards the outlet of the trough by the helicoidal brush which serves at the same time as conveyor. A selfcleaning coating machine is thus obtained, with inexpensive means, which enables the machine to be thoroughly cleaned after each work station or between manufactures of different products.

FIG. 7 shows a partial plan view of a variant embodiment of a machine according to the invention.

FIG. 7 shows an example of a machine comprising a trough 35 composed of a bottom in the form of a semi-cylinder extended by two vertical lateral walls.

It is specified that the trough may also be in the form shown in FIG. 6.

The coating machines according to the invention rotate at very slow speeds of between 20 rpm and 100 rpm. This results in that their output is very reduced. In order to increase output, the idea which naturally comes to mind is to increase the pitch, so that the axial speed of displacement of the products increases.

However, by increasing the pitch, there is an increased distance between two pitches which risks containing too large piles of product, which do not rotate properly on themselves, with the result that coating is no longer uniform.

Moreover, if the piles of products are too large, they exert a higher pressure against the bristles of the helicoidal brush and, as the latter are supple, they tend to bend and allow products to escape and join the pile located upsteam.

FIG. 7 shows a variant embodiment which makes it possible to increase the output of the machine, without increasing the speed of rotation and without increasing the volume of the individual piles 36 of products to be coated.

According to this variant, the machine comprises a rigid drive shaft 37 and two helicoidal brushes 38 and 39, of the same pitch and same direction, which ar intercalated, i.e. they are offset axially by a half-pitch. In this way, each time the shaft rotates through one revolution, the machine delivers two piles 36, but the latter are separated by a layer of bristles whilst they advance along the trough.

A better turbine effect is thus obtained. The piles 36 which are smaller are better mixed and the coating is more uniform.

For the same output of the machine, the quantity of products in each pile 36 is divided by two and each pile therefore exerts a lower pressure on the brush. A greater output may thus be obtained whilst conserving a low speed of rotation and a uniform coating of the products.

It is specified that the embodiment according to FIG. 7 may also be applied to a machine according to FIG. 3 which would then comprise two shafts each bearing two intercalated helicoidal brushes.

FIG. 8 shows a transverse section of a variant embodiment of part of the machine according to the invention intended for manufacturing burst cereals of the popcorn type.

It is recalled that the manufacture of such cereals includes a step of coating in oil, possibly steps of coating in products such as honey or sugar, and a step of bursting in contact with a wall heated to a temperature of between 120° and 150° C.

FIG. 8 shows a section through that part of the machine in which bursting takes place, this part following a part where coating has taken place.

FIG. 8 shows an example of machine comprising a trough 40 similar to that of FIG. 6 and one helicoidal helix.

It is specified that this example is not limiting. The embodiment according to FIG. 8 may also comprise a trough having two flat lateral walls or a machine according to FIGS. 3 to 5 comprising two parallel endless screws or a machine according to FIG. 7 comprising two intercalated helicoidal brushes.

The bristles of the helicoidal brush of the machine according to FIG. 8 are composed of stainless steel strands 41 which are implanted on a metal drive shaft 42 along a helix having a left-handed pitch.

The Figure is a view in the direction of flow of the products, shaft 42 being driven in clockwise direction. The trough 40 comprises a double wall 43a, 43b which defines an intermediate space 44 in which is circulated a heat-exchanging fluid, for example dry steam or an oil, at a temperature of the order of 150° C., with the result that the cereals 45 burst upon contact with the hot wall. Mixing of the products due to the action of the brush causes all the cereals to come into contact with the hot wall and burst. The outer wall 43a advantageously bears a heat-insulating coating 46.

In a variant embodiment, instead of using a double-walled trough in which a heat-exchanging fluid circulates, a metal trough may be used which is heated locally by flames of burners or by electrical resistors dispose inside a heat-insulated casing.

FIG. 6 shows an embodiment in which the vertical wall 29, which is swept by the bristles of the brush in the rising direction and against which products 26 accumulate, comprises a rib 47 projecting inside the chute 32.

This rib is disposed substantially at the level of the upper generatrix of said helicoidal brush 25.

It has been noted that the products to be coated which rub against the wall 29 tend to stick to said wall and to continue to rise therealong under the thrust of new products. In the long run, there is thus formed a band of products stuck to the wall above the zone which is swept by the brush. Rib 47 avoids the formation of this band of products immobilized against the wall.

The products located below rib 47 are permanently renewed by new products pushed by the brush.

Concerning the embodiment according to FIGS. 3 and 4, it has been seen that the piles of products 18 are formed between the two helicoidal brushes, without being in contact with the lateral walls of the trough 14. This avoids products sticking against the wall and progressing downstream whilst remaining stuck thereto, heance a poor coating.

FIGS. 9 and 10 respectively show a partial plane view and a transverse section along X—X of a variant embodiment of a coating machine according to FIG. 3.

In this variant, the machine comprises two helicoidal brushes 49d, 49g of which the drive shafts 50d, 50g are disposed in parallel in the bottom of a trough 51. Arrow F indicates the direction of flow of the products.

The two helicoidal brushes have opposite pitches. Brush 49d is driven in rotation in clockwise direction and it has a left-handed pitch. Brush 49g is driven in anti-clockwise direction and it has a right-handed pitch.

FIG. 3 shows a machine in which the two brushes are disposed symmetrically with respect to the longitudinal median plane MM'. FIG. 9 represents a variant in which the two helicoidal brushes are offset longitudinally with respect to each other.

The effect of this arrangement is to provoke a more intensive mixing and better coating of the products. The solid cores 52 to be coated advance in the central zone located between the two helicoidal brushes which move upwardly and the cores undergo, in this zone, continuous movements of rotation both in the longitudinal direction and in the transverse direction, which lead to a very homogeneous coating on all the faces of the core.

The intensive mixing of the particles is improved by slightly modifying the shape of the bottom of the trough which comprises, between the two brushes, a rib 53 of rounded form which facilitates the flow of the particles.

FIGS. 3 and 9 show helicoidal brushes which are tangential to the median plane MM'. It is specified that this arrangement is not limiting. The brushes may be slightly spaced from the median plane or, on the contrary, they may intersect the median plane slightly.

The two brushes of a machine according to FIGS. 9 and 10, which have reverse pitches and directions of rotation, may be driven in rotation either at the same speed or at different speeds in order to increase mixing of the cores.

FIGS. 9 and 10 show a machine equipped with a device 81, in the form of a gable roof which is symmetrical with respect to the median plane MM' and which is located above the two brushes. The device 81 avoids projections of products from the trough and the formation of deposits against the vertical walls of the trough. The device 81 may be composed of a plurality of removable sections, this enabling certain sections to be removed wherever it is desired to introduce products into the trough.

A machine according to the invention is frequently used for coating soft gelatinous or pasty cores which are fragile, easily deformable products and care must be taken when introducing these products into the machine. The soft cores cannot be poured into the trough vertically as a large number would be impaled on the bristles of the brush and would be broken, this leading to an unacceptable finished product.

FIGS. 11 and 12 show a device for introducing fragile products into the upstream end of a machine according to the invention which comprises a trough 53 and one helicoidal brush 54 which has a right-handed pitch and which is driven in anticlockwise direction. The upstream end of the trough is located above an endless conveyor belt 55 which moves perpendicularly to the axis of the helicoidal brush. The trough comprises a lateral opening whose width is substantially equal to that of the conveyor and this opening is located on that side of the trough swept by the bristles of the brush in the descending direction and it is opposite the conveyor 55. The bristles of the brush rub against the upper side of the endless belt on which lie the products 58 which are poured for example through a chute 57. The lower edge 59 of the opening 56 is placed against the upper face of the conveyor belt. The products 58 are pushed inside the trough by the bristles of the brush and they accumulate in piles in the upper part of the edge of the trough which is swept by the bristles in the ascending direction.

FIGS. 13 and 14 show a longitudinal section and a transverse section along XIV—XIV of part of a machine according to the invention, used for continuously cooking food products in a bath of hot oil, for example peanuts, almonds or extruded paste.

The machine comprises an upwardly open trough 60 made of stainless steel in which is disposed a stainless steel shaft 61 driven in rotation at a low speed, less than 50 rpm. The shaft 61 bears helicoidal brushes composed of flexible stainless steel strands which are implanted radially and helically on shaft 61.

Trough 60 presents a central section 62 intercalated between two sections 63a and 63b of smaller transverse cross-section to which it is joined by a truncated part.

Shaft 61 bears a helicoidal brush 64 which is disposed along the central section 62 and which comprises steel strands whose length is substantially equal to the distance separating the periphery of shaft 61 from the bottom of the trough 62. The shaft 61 bears two helicoidal brushes 65a and 65b of smaller diameter located on either side of brush 64.

The central section 62 contains in its bottom a bath 66 of hot oil which circulates preferably in contra-flow with respect to the direction of circulation of the products represented by arrow F1. The hot bath arrives in the bottom of the trough via an inlet 67a and it leaves via outlet 67b. The circuit in which the oil circulates comprises a circulation pump, means for heating the oil and a filter for stopping the products in suspension. The height of the bath of oil 66 is maintained less than the depth of the bottom of the trough 62 with respect to the bottoms of the troughs 63a and 63b, with the result that the oil remains in the central trough 62 where the products are cooked. The latter pass slowly through the central section 62 whilst being subjected to the action of the helicoidal brush 64 which advances them and which, at the same time, subjects them to a mixing which causes the products to rotate on themselves, with the result that a uniform cooking is obtained.

A machine according to FIGS. 13 and 14 may serve for cooking either products heavier than oil, such as peanuts, which drop to the bottom of the trough 62, or lighter products which float on the surface of the bath. The flexible steel strands of the helicoidal brushes perform a triple action of advancing the products, of mixing with turning and of permanently sweeping the walls of the trough against which the strands rub.

FIGS. 15 and 16 respectively show a plan view and a transverse section along XVI—XVI of another embodiment of a machine according to the invention which serves both to coat and to cook food products, particularly for making burst cereals of the popcorn type.

Manufacture of burst cereals includes a first operation whereby grains of corn, rice or wheat are coated with oil and other products such as sugar, salt, honey, chocolate, then they are heated to make them burst.

FIGS. 15 and 16 show a machine capable of effecting these successive operations.

This machine comprises a first trough 68 which contains a first helicoidal brush, constituted by a stainless steel shaft 69, bearing strands of stainless steel 70 implanted in a helix having a left-handed pitch. Shaft 69 is driven in rotation in clockwise direction by a motor 71, at slow speed, less than 100 rpm.

The cereals are poured into trough 68 at the left-hand end in the Figure and they are displaced in the direction of arrow F2.

Whilst they are moving, the cereals form piles against the lateral wall of the trough which is swept by the bristles of the brush in the rising direction and they rotate on themselves, this enabling them to be uniformly coated with oil, honey or powdery products such as salt, sugar, cocoa.

The cereals are coated in the section of the trough 68 located to the left in the Figure and in this section, the trough comprises an opening, in its upper part, in which the piles of cereals are formed and mixed as set forth hereinabove.

Trough 68 is extended towards the right by a section 68a, in which the cereals are made to burst. This section of trough has a thick, good heat-conducting wall, for example made of copper, and it is heated for example by the flame 72 of a burner or by electrical resistors or by any other equivalent heating means, to a temperature sufficient to cause the oil-impregnated cereals to burst.

The machine comprises a second trough 73 located above section 68a and which is offset laterally with respect thereto. Trough 73 contains a shaft 74 which is driven in rotation in clockwise direction at a speed of less than 100 rpm by a motor 75 and shaft 74 bears stainless steel strands forming a helicoidal brush 76 having a left-handed pitch. The trough 73 comprises in its upper part an opening 77 having a vertical lateral wall which extends the circular bottom of the trough which is swept in rising direction by the bristles of the brush and the burst cereals form piles 78, located between the layers of bristles of the brush and against the vertical wall of the opening 77 as set forth hereinabove.

The circular bottom of trough 73 and the brush 76 have a diameter greater than the diameter of the circular bottom of trough 68, 68a and than that of brush 70.

As shown in FIG. 16, the top of section 68a of the lower trough is closed by a circular wall which comprises a lateral opening 79 which is placed opposite a lateral opening in the bottom of trough 73, the two troughs being fixed to each other along the two longitudinal edges of the common opening 79 by screws, by welding or by any other equivalent means.

The opening 79 in the lower trough extends substantially over the whole upper quadrant of the trough which is located on the side swept in the rising direction by brush 70.

Operation is as follows:

The cereals poured into trough 68 are uniformly coated with oil and possibly with other products whilst they are moving in this trough in the direction of arrow F2. The coated cereals arrive in the heated section 68a where they burst. Their volume considerably increases and their density decreases.

The burst cereals are taken along by brush 70 towards opening 79 and, under the effect of the increase in volume and the pressure due to the bursts, they penetrate in the bottom of the trough 73 where they are swept by the bristles of brush 76 which drive them upwardly where they form piles 78. In this way, the burst cereals are evacuated out of section 68a, where they would risk being deteriorated, as they are produced.

Thanks to its larger diameter, the brush 76 disposed in trough 73 is capable of absorbing the increase in volume due to the expansion of the cereals. The burst cereals accumulate in orifice 79 located between the two troughs before being taken up by brush 76 and they form a screen which reduces the losses of heat from trough 68a and which avoids too high a rise in temperature in trough 73.

FIG. 15 shows, on the right-hand side, an exploded part showing a grid 80 which is disposed in the bottom of trough 68a, at the downstream end thereof and which makes it possible to evacuate the unburst cereals which may be recycled. The upstream and downstream ends of trough 68a are closed. The upstream end of trough 73 is closed whilst the downstream end is open and serves to evacuate the products. It is possible to coat the cereals already burst during their path in trough 73.

It is specified that the single helicoidal brushes shown in FIGS. 9, 11, 13 and 15 may be replaced by double helicoidal brushes intercalated in each other and offset by a half-pitch like those shown in FIG. 7.

FIG. 18 shows a transverse section through a variant embodiment of a machine according to the invention comprising two helicoidal brushes 82g and 82d, rotating in opposite directions to each other, disposed in a trough 83. The lateral walls of the trough are, in the lower part, in the form of a cylinder which envelops the helicoidal brushes.

These cylindrical walls extend upwardly, above the upper generatrix of the brushes, by two flat walls which are symmetrical with respect to the plane MM' and which converge towards this plane in the rising direction. The machine comprises a source of radiating heat 84, constituted for example by an infrared emitter which is located above the intermediate part between the two brushes in which the products to be coated accumulate. These products are permanently subjected to the action of the infrared radiation and, thanks to the rotation of the products due to the mini-turbine effect, the products subjected to radiation are renewed and present all their faces successively to the infrared radiation, this enabling the coating of the products to be uniformly dried.

FIG. 18 shows a transverse section of a variant embodiment of a machine according to the invention comprising a section for cooling the products by a stream of cold air or for drying by a stream of hot air.

This machine, like the preceding one, comprises two helicoidal brushes 85g, 85d rotating in opposite directions, disposed in a fixed trough 86 having cylindrical walls which envelop the outer part of the helicoidal brushes.

The central part 87 of the bottom of the trough is perforated and it communicates with a sheath 88 which blows cold or hot air depending on the applications.

The trough comprises air extraction means, for example a suction sheath 89 which is placed above the brushes and which is supported by the vertical walls of the trough 86.

The air arriving via sheath 88 passes through the perforated bottom 87 then through the products 90 which are concentrated in the central part located between the two brushes and it is taken up by sheath 89. Intensive mixing of the products 90 allows very rapid cooling or drying thereof over all their faces.

FIGS. 19 and 20 show a partial plan view and a transverse section through a variant embodiment of a machine according to the invention.

FIGS. 3 and 9 show machines which comprise two helicoidal brushes driven in rotation in opposite directions from each other and having pitches of opposite direction, with the result that the two brushes take the products along longitudinally in the same direction.

In the case of FIG. 3, the speeds of rotation of the two brushes are equal, as are the speeds of translation.

In the case of FIG. 9, the speeds of translation may be unequal, either the speeds of rotation being unequal or the pitches having different lengths.

FIGS. 19 and 20 show a variant embodiment of a machine comprising two helicoidal brushes 91d, 91g, placed in the same trough 92, in which the two helicoidal brushes are always driven in rotation in opposite direction from each other, so that they move in rising direction in the central part, but the pitches of the two brushes are of the same direction, with the result that the brushes take the products along longitudinally with speeds of translation of opposite direction and unequal.

For example, brush 91g which rotates in anti-clockwise direction, has a right-handed pitch and it takes the products along at a speed of translation represented by arrow VA, whilst brush 91d, which rotates in clockwise direction, also has a right-handed pitch and it takes the products along in translation at a speed VB which is of direction opposite to speed VA and which is clearly lower in absolute value than VA.

Speed VA is preferably greater than twice VB.

In the case of the Figure, the pitches of the two brushes are equal and the difference in speed is obtained by rotating brush 91d less quickly than brush 91g. In a variant, brush 91d may have the same speed of rotation as brush 91g, but a shorter pitch.

In any case, the product of the pitch by the speed of rotation of one brush is clearly greater than the product of the pitch by the speed of rotation of the other brush.

Thanks to this arrangement, the cores 93 which accumulate between the two brushes are taken along alternately by one or the other of the two brushes, sometimes in one direction, sometimes in the other, with the result that they follow a windy path comprising loops and they dwell in the machine longer. As speed VA is clearly greater than VB, the average speed of the cores is directed according to VA.

A machine according to FIGS. 19 and 20 makes it possible to obtain a very uniform coating with brushes of reduced length. It also enables small quantities of cores to be coated.

What is claimed is:

1. A machine for continuously and uniformly coating confectionery products comprising solid gelatinous or pasty cores, with liquid and/or powdery products, of the type comprising a substantially horizontal fixed trough provided with lateral walls, an endless screw which is driven in rotation in this trough, and means for introducing said cores and for pouring said liquid and-/or powdery products into said trough, wherein said machine comprises at least one helicoidal brush composed of bristles implanted radially and helically on at least one drive shaft which is driven in rotation in said trough at a speed of less than 100 rpm and said trough is upwardly open, has a height greater than the diameter of said brush and has a cylindrical bottom which envelops said brush in an area located beneath said drive shaft.

2. The machine of claim 1, comprising two helicoidal brushes of the same diameter composed of bristles implanted radially and helically on two parallel drive shafts which are driven in rotation in opposte directions and such that the bristles of the two brushes move upwardly in a central portion of the trough.

3. The machine of claim 2, wherein the two brushes have pitches of the same direction and a product obtained by multiplying the pitch by the speed of rotation of one brush is greater than a product obtained by multiplying the pitch by the speed of rotation of the other brush.

4. The machine of claim 2, wherein the cylindrical bottom of said trough is composed of two semi-cylindrical joined portions each of which envelops a portion of a brush and which forms in a central portion a rib in relief which engages between the two brushes.

5. The machine of claim 2, wherein at least one of the lateral walls of said trough which is swept by the brush bristles in the descending direction has a cylindrical form which extends the cylindrical bottom of said trough and which envelops at least one of said brushes in the part lying above the drive shafts.

6. The machine of claim 1, wherein at least one of the lateral walls of said trough which is swept by the brush bristles in a descending direction has a cylindrical form which extends the cylindrical bottom of said trough and which envelops at least one of said brushes in the area lying above the drive shafts.

7. The machine of claim 1, wherein it comprises a plurality of helicoidal brushes which are composed of bristles implanted radially on the same shaft in two intercalated helices, i.e. in two parallel helices of the same pitch which are offset axially with respect to each other.

8. The machine of claim 1, adapted for manufacturing popcorn or the like, comprising a heated section in which said bristles are strands of stainless steel and in which the walls of the trough are heated to a temperature of between 120° C. and 150° C.

9. The machine of claim 8, comprising a second trough containing a second helicoidal brush which is parallel to said heated section and which is offset upwardly with respect thereto and said heated section comprises a cylindrical envelope which communicates via a lateral opening with the second trough, which opening is located in the upper quarter of said cylindrical envelope which is swept on rising by the helicoidal brush of the heated section and in the lower quarter of said second trough which is swept on descending by the second helicoidal brush.

10. The machine of claim 1 intended for cooking said products in a bath of hot oil, wherein said trough comprises a central section which is interposed between two other sections of which the bottom is located higher than the bottom of said central section and said helicoidal brush comprises a shaft made of stainless steel on which are implanted strands of stainless steel which form a central brush which is located in said central section and two lateral brushes which surround said central brush and the strands of said central brush are longer than those of said lateral brushes.

11. The machine of claim 1, comprising a device for introducing said cores in the upstream end of said trough, which device comprises a conveyor belt located beneath said trough, which presents the form of a cylindrical envelope having a lateral opening lying in a lateral wall which is swept by a brush in the descending direction and the lower edge of said opening is placed against the upper face of said conveyor.

* * * * *